(12) United States Patent
Barnhoefer et al.

(10) Patent No.: US 9,330,606 B2
(45) Date of Patent: May 3, 2016

(54) ELECTRONIC DEVICE WITH DISPLAY BRIGHTNESS CONTROL

(71) Applicant: Apple Inc., Cupertino, CA (US)

(72) Inventors: Ulrich Barnhoefer, Cupertino, CA (US); Venu M. Duggineni, Santa Clara, CA (US); Clifford E. Russell, San Jose, CA (US)

(73) Assignee: Apple Inc., Cupertino, CA (US)

( * ) Notice: Subject to any disclaimer, the term of this patent is extended or adjusted under 35 U.S.C. 154(b) by 693 days.

(21) Appl. No.: 13/629,248

(22) Filed: Sep. 27, 2012

(65) Prior Publication Data

US 2013/0328842 A1    Dec. 12, 2013

Related U.S. Application Data

(60) Provisional application No. 61/657,585, filed on Jun. 8, 2012.

(51) Int. Cl.
  *G09G 5/00* (2006.01)
  *G09G 3/34* (2006.01)
  *G06F 3/044* (2006.01)

(52) U.S. Cl.
  CPC ............... *G09G 3/3406* (2013.01); *G06F 3/044* (2013.01); *G09G 2320/0261* (2013.01); *G09G 2320/0653* (2013.01); *G09G 2354/00* (2013.01); *G09G 2360/144* (2013.01)

(58) Field of Classification Search
  USPC .................................. 345/207; 455/550.1, 566
  See application file for complete search history.

(56) References Cited

U.S. PATENT DOCUMENTS

| 4,516,055 | A | 5/1985 | Nelson |
| 5,483,261 | A | 1/1996 | Yasutake |
| 5,488,204 | A | 1/1996 | Mead et al. |

(Continued)

FOREIGN PATENT DOCUMENTS

| CN | 101558372 | 10/2009 |
| CN | 101584124 | 11/2009 |

(Continued)

OTHER PUBLICATIONS

Final Office Action mailed Aug. 2, 2010, for U.S. Appl. No. 11/800,293, filed May 4, 2007, 17 pages.

(Continued)

*Primary Examiner* — Calvin C Ma
(74) *Attorney, Agent, or Firm* — Treyz Law Group, P.C.; G. Victor Treyz; Zachary D. Hadd

(57) ABSTRACT

Automatic display brightness adjustments may be made by an electronic device based on ambient light sensor data. Proximity sensor data from a light-based proximity sensor, from nearby capacitive sensor electrodes in a touch screen, or from other proximity sensing components may be used to determine whether the ambient light sensor is being shadowed by a hand or other external object. Ambient light sensor data associated with blocked sensor conditions can be suppressed. A transient event filter may be used to remove spikes from ambient light sensor data. A display brightness baseline may be adaptively adjusted. Short changes in ambient light level may result in corresponding momentary adjustments to display brightness. Longer changes in ambient light level may be associated with persistent changes in the display brightness baseline.

22 Claims, 13 Drawing Sheets

(56) References Cited

U.S. PATENT DOCUMENTS

| | | | |
|---|---|---|---|
| 5,825,352 | A | 10/1998 | Bisset et al. |
| 5,835,079 | A | 11/1998 | Shieh |
| 5,880,411 | A | 3/1999 | Gillespie et al. |
| 6,094,185 | A | 7/2000 | Shirriff |
| 6,188,391 | B1 | 2/2001 | Seely et al. |
| 6,310,610 | B1 | 10/2001 | Beaton et al. |
| 6,323,846 | B1 | 11/2001 | Westerman et al. |
| 6,529,212 | B2 | 3/2003 | Miller et al. |
| 6,690,387 | B2 | 2/2004 | Zimmerman et al. |
| 6,713,745 | B2 | 3/2004 | Lin et al. |
| 6,762,741 | B2 | 7/2004 | Weindorf |
| 6,865,405 | B2 | 3/2005 | Lin |
| 7,015,894 | B2 | 3/2006 | Morohoshi |
| 7,095,392 | B2 | 8/2006 | Lin |
| 7,184,064 | B2 | 2/2007 | Zimmerman et al. |
| 7,605,829 | B2 | 10/2009 | Oh |
| 7,663,607 | B2 | 2/2010 | Hotelling et al. |
| 7,701,434 | B2 | 4/2010 | Kreek et al. |
| 7,714,265 | B2 | 5/2010 | Fadell et al. |
| 7,800,044 | B1 | 9/2010 | Kahn et al. |
| 8,068,125 | B2 * | 11/2011 | Pantfoerder ............... 345/690 |
| 8,405,688 | B2 | 3/2013 | Pantfoerder |
| 2004/0233153 | A1 | 11/2004 | Robinson |
| 2005/0117062 | A1 | 6/2005 | Chien et al. |
| 2006/0026521 | A1 | 2/2006 | Hotelling et al. |
| 2006/0197753 | A1 | 9/2006 | Hotelling |
| 2007/0040774 | A1 | 2/2007 | Lee et al. |
| 2007/0222730 | A1 | 9/2007 | Kao et al. |
| 2008/0158172 | A1 | 7/2008 | Hotelling et al. |
| 2008/0165116 | A1 | 7/2008 | Herz et al. |
| 2008/0165203 | A1 * | 7/2008 | Pantfoerder ............... 345/589 |
| 2009/0305742 | A1 * | 12/2009 | Caballero et al. .......... 455/566 |
| 2011/0175925 | A1 * | 7/2011 | Kane et al. ............... 345/589 |
| 2011/0201381 | A1 | 8/2011 | Herz et al. |
| 2011/0248172 | A1 | 10/2011 | Rueger et al. |
| 2012/0169236 | A1 | 7/2012 | Kim |

FOREIGN PATENT DOCUMENTS

| | | |
|---|---|---|
| CN | 102299704 | 12/2011 |
| CN | 102376265 | 3/2012 |
| EP | 2413310 | 2/2012 |
| JP | 2000-163031 A | 6/2000 |
| JP | 2002-342033 A | 11/2002 |
| KR | 10-2009-0099575 | 9/2009 |
| KR | 10-2012-023529 | 3/2012 |

OTHER PUBLICATIONS

Final Office Action mailed Apr. 6, 2011, for U.S. Appl. No. 11/800,293, filed May 4, 2007, 17 pages.

Lee, S.K. et al. (Apr. 1985). "A Multi-Touch Three Dimensional Touch-Sensitive Tablet," Proceedings of CHI: ACM Conference on Human Factors in Computing Systems, pp. 21-25.

Non-Final Office Action mailed Feb. 16, 2010, for U.S. Appl. No. 11/800,293, filed May 4, 2007, 14 pages.

Non-Final Office Action mailed Dec. 3, 2010, for U.S. Appl. No. 11/800,293, filed May 4, 2007, 15 pages.

Notice of Allowance mailed Aug. 10, 2011, for U.S. Appl. No. 11/800,293, filed May 4, 2007, 9 pages.

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Pantfoerder, U.S. Appl. No. 13/777,072, filed Feb. 26, 2013.

Pantfoerder, U.S. Appl. No. 13/304,176, filed Nov. 23, 2011.

Pantfoerder, U.S. Appl. No. 11/800,293, filed May 4, 2007.

Lumenology Company, TSL2772 Light-to-Digital Converter with Proximity Sensing, Dec. 2011 (34 pages).

Vandenberghe, JP: "The Eye", Pro Video Coalition, Dec. 26, 2010, XP002715689, Retrieved from the Internet [Retrieved on Oct. 29, 2013 ] :URL:http://provideocoalition.com/pvcexclusive/story/the_eye>.

* cited by examiner

ELECTRONIC DEVICE WITH DISPLAY BRIGHTNESS CONTROL

This application claims the benefit of provisional patent application No. 61/657,585, filed Jun. 8, 2012, which is hereby incorporated by reference herein in its entirety.

BACKGROUND

This relates generally to electronic devices and, more particularly, to electronic devices with adjustable display brightness.

Electronic devices such as cellular telephones and computers are often exposed to varying ambient light levels. For example, the amount of ambient light to which a cellular telephone is exposed will change as a user passes between an interior location in a building and an outdoors environment with bright sun. Ambient light levels may also change as a user moves about indoors or as a user moves from a sunny to a shady outdoors location. To accommodate these ambient light level changes, electronic devices are sometimes provided with automatic display brightness adjustment capabilities. If care is not taken, however, automatic adjustments may be intrusive or may not adequately reflect actual ambient lighting conditions.

It would therefore be desirable to be able to provide improved ways in which to automatically adjust display brightness in electronic devices.

SUMMARY

Automatic display brightness adjustments may be made by an electronic device based on ambient light sensor data. Proximity sensor data from a light-based proximity sensor, from nearby capacitive sensor electrodes in a touch screen, or data from other proximity sensing components may be used to determine whether the ambient light sensor is being shadowed by a hand or other external object. Ambient light sensor data associated with blocked sensor conditions can be suppressed.

A transient event filter may be used to remove spikes from ambient light sensor data. A display brightness baseline may be adaptively adjusted. Short changes in ambient light level may result in corresponding momentary adjustments to display brightness. Longer changes in ambient light level may be associated with persistent changes in the display brightness baseline.

A transfer function may be used in determining how to adjust display brightness based on ambient light sensor readings. The transfer function may be formed from coupled line segments or other suitable curves. At moderate ambient light levels, display brightness may be affected by a reflective light component that is proportional to the current ambient light reading and may be affected by a lamp-type offset component that is independent of ambient light levels. At low ambient light levels, the transfer function may be characterized by a dark eye response in which the lamp contribution to the display brightness is phased out as a function of decreasing ambient light level. At high ambient light levels, the lamp contribution can be phased out with increasing ambient light level in favor of the reflective light component. At very high ambient light levels, the display brightness may be set to its maximum brightness, regardless of ambient light reading.

User input may be used to make adjustments to the transfer function. The way in which user input is used to adjust the transfer function may vary as a function of the current ambient light reading. A user may, for example, be provided with an adjustable on-screen slider or other control interface that can be manipulated to change the transfer function. When the ambient light level is low, changes to the slider may result in changes to the dark eye response portion of the transfer function. When the ambient light level is high, changes to the slider may affect the reflective portion of the transfer function.

A dynamic threshold may be used in determining how transfer function changes are made when ambient light levels are moderate. When operating below the dynamic threshold, lamp-type behavior dominates, so changes to the slider may affect lamp-type transfer function settings. When operating above the dynamic threshold, reflective-type behavior dominates, so changes to the slider may be used to change reflective transfer function attributes.

Further features of the invention, its nature and various advantages will be more apparent from the accompanying drawings and the following detailed description of the preferred embodiments.

DETAILED DESCRIPTION

An electronic device may be provided with one or more displays. A user may make manual display setting adjustments. Automatic adjustments may also be made during operation of the electronic device.

The electronic device may be provided with a display such as a liquid crystal display or other display that has an adjustable backlight or may be provided with a display such as an organic light-emitting diode display having display pixels with adjustable intensity levels. During operation of the electronic device, the brightness of the display may be adjusted to accommodate changes in ambient lighting levels. If, for example, the electronic device is being operated in a bright environment, display brightness can be increased so that images on the display do not appear washed out. If the electronic device is being operated in a dark environment, display brightness can be reduced so that images on the display are not uncomfortably bright for the user.

Figure 1A:
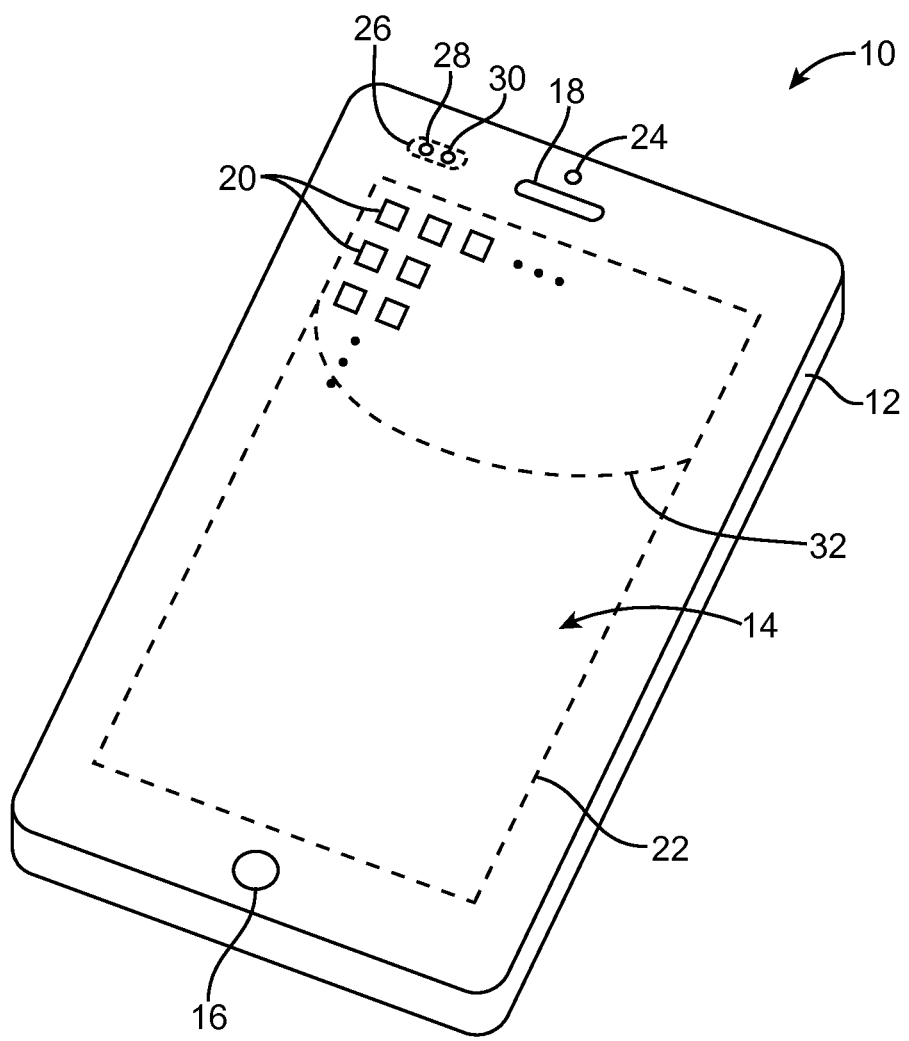
FIGS. 1A and 1B are perspective views of illustrative electronic devices that may be provided with automatic display brightness adjustment capabilities in accordance with embodiments of the present invention.
Figure 1B:
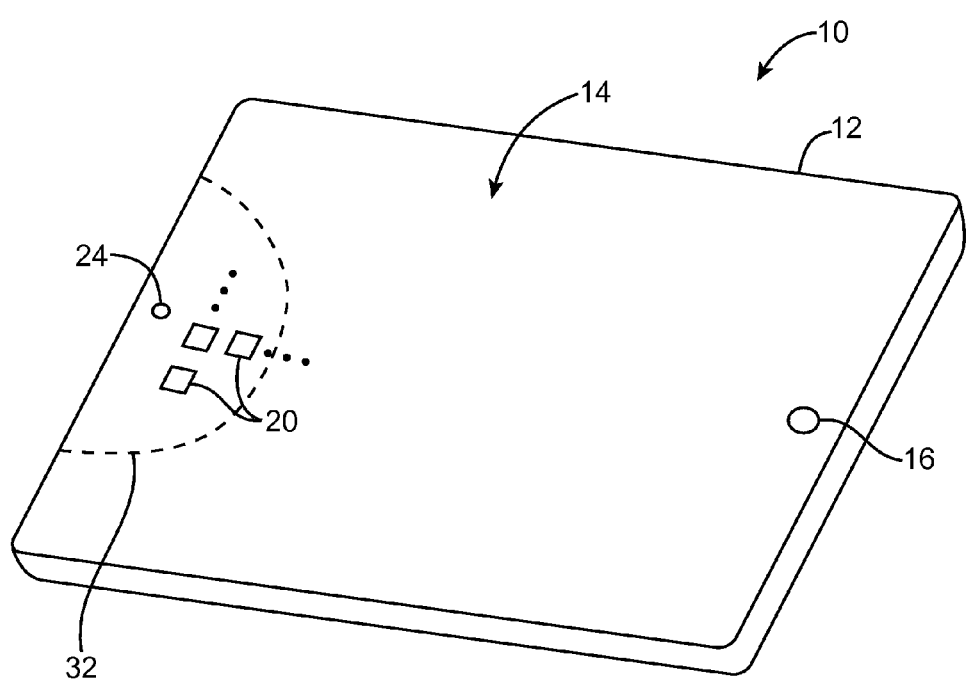

Illustrative electronic devices that may be provided with adjustable displays are shown in FIGS. 1A and 1B. Electronic devices such as devices 10 of FIGS. 1A and 1B may be cellular telephones, media players, other handheld portable devices, somewhat smaller portable devices such as wristwatch devices, pendant devices, or other wearable or miniature devices, gaming equipment, tablet computers, notebook computers, desktop computers, televisions, computer monitors, computers integrated into computer displays, or other electronic equipment. In the example of FIG. 1A, device 10 is a portable electronic device such as a cellular telephone, media player, or other handheld electronic device. In the example of FIG. 1B, device 10 is a portable device such as a tablet computer. These are merely illustrative examples. Electronic devices 10 may, in general, be based on any suitable electronic equipment with displays.

As shown in the example of FIG. 1A, device 10 may include a display such as display 14. Display 14 may be mounted in a housing such as housing 12. Housing 12 may have upper and lower portions joined by a hinge (e.g., in a laptop computer) or may form a structure without a hinge, as shown in FIG. 1A. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Display 14 may be a touch screen that incorporates a layer of conductive capacitive touch sensor electrodes such as electrodes 20 or other touch sensor components (e.g., resistive touch sensor components, acoustic touch sensor components, force-based touch sensor components, light-based touch sensor components, etc.) or may be a display that is not touch-sensitive. Capacitive touch screen electrodes 20 may be formed from an array of indium tin oxide pads or other transparent conductive structures.

Display 14 may include an array of display pixels formed from liquid crystal display (LCD) components, an array of electrophoretic display pixels, an array of plasma display pixels, an array of organic light-emitting diode display pixels, an array of electrowetting display pixels, or display pixels based on other display technologies. The brightness of display 14 may be adjustable. For example, display 14 may include a backlight unit formed from a light source such as a lamp or light-emitting diodes that can be used to increase or decrease display backlight levels and thereby adjust display brightness. Display 14 may also include organic light-emitting diode pixels or other pixels with adjustable intensities. In this type of display, display brightness can be adjusted by adjusting the intensities of the display pixels.

Display 14 may be protected using a display cover layer such as a layer of transparent glass or clear plastic. Openings may be formed in the display cover layer. For example, an opening may be formed in the display cover layer to accommodate a button such as button 16. An opening may also be formed in the display cover layer to accommodate ports such as speaker port 18.

In the center of display 14 (e.g., in the portion of display 14 within rectangular region 22 of FIG. 1A), display 14 may contain an array of active display pixels. Region 22 may therefore sometimes be referred to as the active region of display 14. The rectangular ring-shaped region that surrounds the periphery of active display region 22 may not contain any active display pixels and may therefore sometimes be referred to as the inactive region of display 14. The display cover layer or other display layers in display 14 may be provided with an opaque masking layer in the inactive region to hid internal components from view by a user. Openings may be formed in the opaque masking layer to accommodate light-based components. For example, an opening may be provided in the opaque masking layer to accommodate an ambient light sensor such as ambient light sensor 24.

If desired, an opening in the opaque masking layer may be filled with an ink or other material that is transparent to infrared light but opaque to visible light. As an example, light-based proximity sensor 26 may be mounted under this type of opening in the opaque masking layer of the inactive portion of display 14. Light-based proximity sensor 26 may include a light transmitter such as light source 28 and a light sensor such as light detector 30. Light source 28 may be an infrared light-emitting diode and light detector 30 may be a photodetector based on a transistor or photodiode (as examples). During operation, proximity sensor detector 30 may gather light from source 28 that has reflected from nearby objects. Other types of proximity sensor may be used in device 10 if desired. The use of a proximity sensor that includes infrared light transmitters and sensors is merely illustrative.

Proximity sensor 26 may detect when a user's head, a user's fingers, or other external object is in the vicinity of device 10 (e.g., within 5 cm or less of sensor 26, within 1 cm or less of sensor 26, etc.). Proximity sensor data can also be gathered using sensors in a touch sensor array such as a touch sensor array in display 14.

As shown in FIG. 1A, for example, display 14 may include touch sensor elements such as touch sensors 20. Touch sensors 20 may be organized in an array that covers the surface of display 14 (i.e., touch sensors 20 may form a touch sensor array for a touch sensitive display). Sensors 20 may, as an example, be implemented using capacitive touch sensor electrodes. When a user's head, a user's finger, or other external object is located in the vicinity of electrodes 20 (e.g., within 5 cm or less, 1 cm or less, or within another suitable distance of the electrodes in region 30 of the touch sensor array), the signals from these electrodes can be used to detect the presence of the external object. Electrodes 20 (e.g., those electrodes 20 that lie within region 32 or other suitable portion of display 14) may be used as a proximity sensor for device 10 (in addition to serving as part of a rectangular touch sensor array that gathers user touch input for controlling device 10).

During operation of device 10, proximity sensor data from proximity sensor 26, proximity sensor data from the proximity sensor structures formed from touch sensors 20 in region 32 of display 14, and/or proximity sensor data from other proximity-sensitive components in device 10 may be used in controlling the adjustment of display brightness for display 14. For example, when proximity sensor measurements (from sensor 26 and/or the sensor formed from the components in region 32) indicate that an external object is present at the upper end of device 10 (i.e., at a location where the external object is overlapping sensor 26 and/or region 32), it can be concluded that this external object is also shadowing ambient light sensor 24. This is because ambient light sensor 24 is in the vicinity of proximity sensor 26 and touch sensor electrodes 32 (e.g., less than 10 cm, less than 5 cm, or less than 1 cm may separate ambient light sensor 24 and the proximity sensor structures).

When ambient light sensor shadowing activity is detected using proximity sensor data, device 10 can adjust the way in which data from the ambient light sensor is interpreted to avoid inaccurate display brightness adjustments. For example, if the ambient light sensor indicates that the environment surrounding device 10 has suddenly experienced a drop in brightness, but proximity sensor data indicates that ambient light sensor 24 is shadowed (e.g., blocked by a user's hand), the measured drop in brightness may ignored. By suppressing ambient light sensor data in this way whenever proximity sensor data indicates that the ambient light sensor is blocked, device 10 may avoid undesired reductions in display brightness when display 14 is in a bright environment.

As shown by the illustrative configuration for device 10 of FIG. 1B, device 10 need not include multiple types of sensors for detecting the presence of ambient light sensor blocking conditions. As an example, device 10 may have only proximity sensor 26 or may have only a proximity sensor formed from a portion of the touch sensor electrodes for display 14 (e.g., the touch sensor array portion within region 32 of FIG. 1B). Configurations with one proximity sensing component, two proximity sensing components, three proximity sensing components, or more than three proximity sensing components may be used. The illustrative configurations for device 10 of FIGS. 1A and 1B are merely illustrative.

Figure 2:
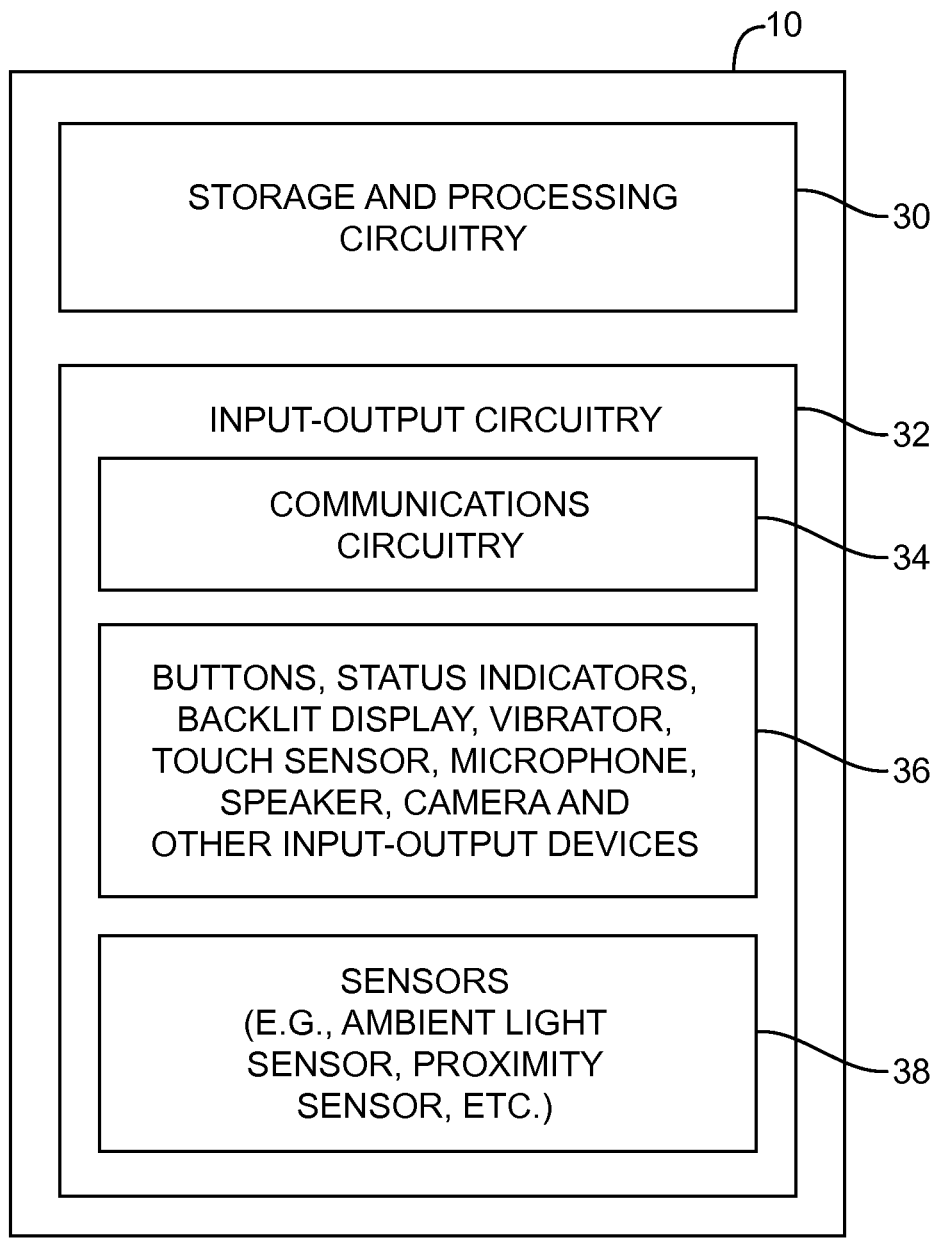
FIG. 2 is a schematic diagram of an illustrative electronic device with display brightness adjustment capabilities in accordance with an embodiment of the present invention.

A schematic diagram of device 10 showing how device 10 may include sensors and other components is shown in FIG. 2. As shown in FIG. 2, electronic device 10 may include control circuitry such as storage and processing circuitry 30. Storage and processing circuitry 30 may include one or more different types of storage such as hard disk drive storage, nonvolatile memory (e.g., flash memory or other electrically-programmable-read-only memory), volatile memory (e.g., static or dynamic random-access-memory), etc. Processing circuitry in storage and processing circuitry 30 may be used in controlling the operation of device 10. The processing circuitry may be based on a processor such as a microprocessor and other suitable integrated circuits. With one suitable arrangement, storage and processing circuitry 30 may be used to run software on device 10, such as internet browsing applications, email applications, media playback applications, operating system functions, software for capturing and processing images, software implementing functions associated with gathering and processing sensor data, software that makes adjustments to display brightness, etc.

Input-output circuitry 32 may be used to allow data to be supplied to device 10 and to allow data to be provided from device 10 to external devices.

Input-output circuitry 32 may include wired and wireless communications circuitry 34. Communications circuitry 34 may include radio-frequency (RF) transceiver circuitry formed from one or more integrated circuits, power amplifier circuitry, low-noise input amplifiers, passive RF components, one or more antennas, and other circuitry for handling RF wireless signals. Wireless signals can also be sent using light (e.g., using infrared communications).

Input-output circuitry 32 may include input-output devices 36 such as button 16 of FIG. 1, joysticks, click wheels, scrolling wheels, a touch screen such as display 14 of FIG. 1, other touch sensors such as track pads or touch-sensor-based buttons, vibrators, audio components such as microphones and speakers, image capture devices such as a camera module having an image sensor and a corresponding lens system, keyboards, status-indicator lights, tone generators, key pads, and other equipment for gathering input from a user or other external source and/or generating output for a user.

Sensor circuitry such as sensors 38 of FIG. 2 may include an ambient light sensor for gathering information on ambient light levels such as ambient light sensor 24. Ambient light sensor 24 may include one or more semiconductor detectors (e.g., silicon-based detectors) or other light detection circuitry. Sensors 38 may also include proximity sensor components. Sensors 38 may, for example, include a dedicated proximity sensor such as proximity sensor 26 and/or a proximity sensor formed from touch sensors 20 (e.g., a portion of the capacitive touch sensor electrodes in a touch sensor array for display 14 that are otherwise used in gathering touch input for device 10 such as the sensor electrodes in regions 32 of FIGS. 1A and 1B). Proximity sensor components in device 10 may, in general, include capacitive proximity sensor components, infrared-light-based proximity sensor components, proximity sensor components based on acoustic signaling schemes, or other proximity sensor equipment. Sensors 38 may also include a pressure sensor, a temperature sensor, an accelerometer, a gyroscope, and other circuitry for making measurements of the environment surrounding device 10.

During operation of device 10, device 10 may experience abrupt transients in the amount of ambient light that is measured using ambient light sensor 24. For example, a shadow may briefly fall over ambient light sensor 24 when a person walks by device 10. The person may be too far from the proximity sensor to be detected by the proximity sensor. Nevertheless, because the shadow is only brief in duration, it would be distracting to the user to make a corresponding abrupt decrease in display brightness.

To avoid unwanted abrupt increases and decreases in display brightness in response to transients in measured ambient light level, control circuitry 30 of device 10 may be configured to implement a transient data filter. The transient data filter, which may sometimes be referred to as a low pass filter or spike filter, may be used to filter out transient events with a duration of less than a predetermined cutoff amount. As an example, the transient data filter may be used to suppress ambient light sensor transients (e.g., upward or downwards spikes in intensity) with a duration of less than 2 seconds (or other suitable duration).

Figure 3:
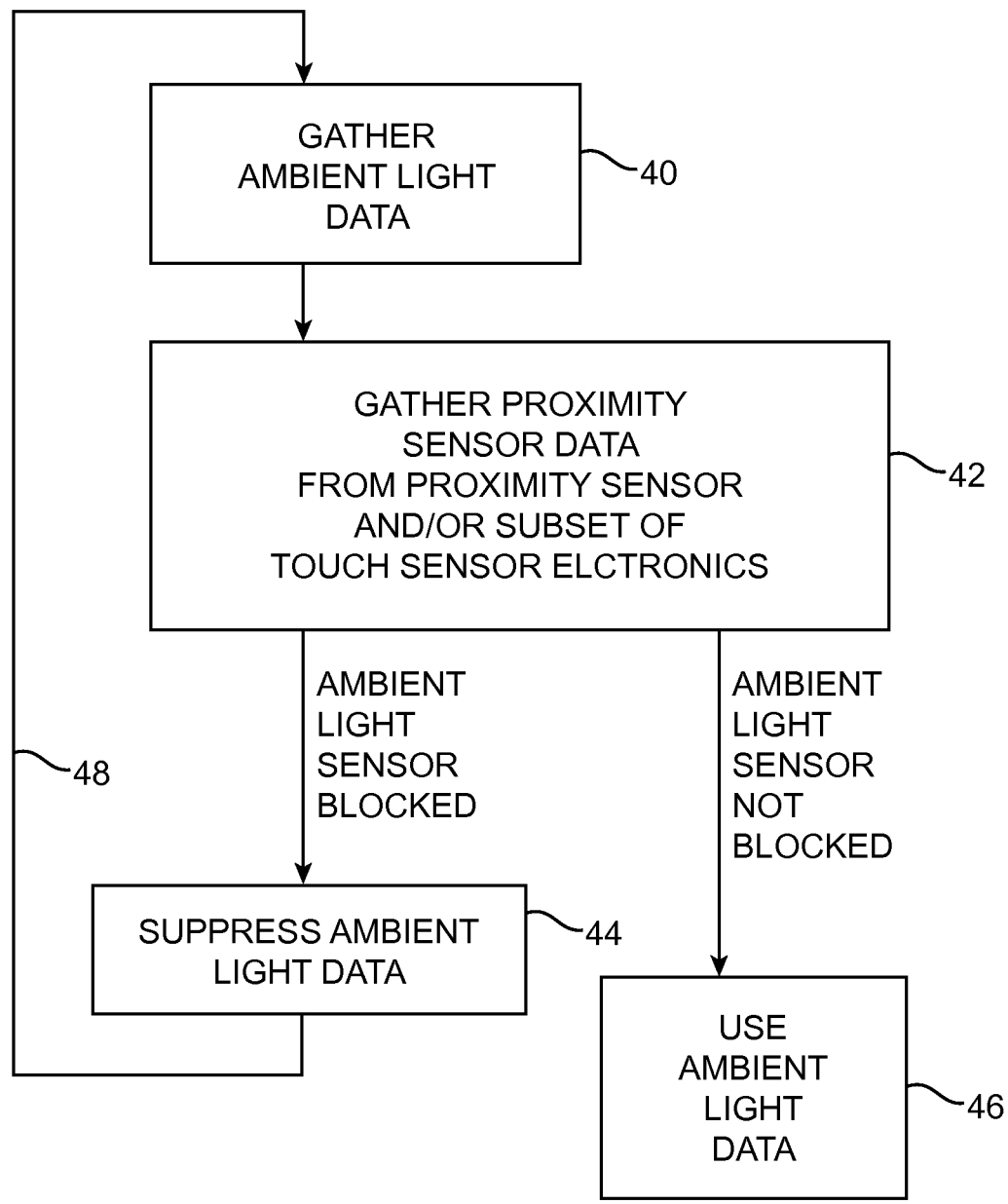
FIG. 3 is flow chart of illustrative steps involved in adjusting the use of ambient light data based on proximity sensor data such as data from a light-based proximity sensor and a capacitive touch screen sensor in accordance with an embodiment of the present invention.

FIG. 3 is a flow chart of illustrative steps of the type that may be used in processing ambient light sensor data in device 10. At step 40, device 10 (i.e., control circuitry 30) may use ambient light sensor 24 to gather ambient light data. Ambient light readings may be used to characterize the amount of ambient light in the vicinity of device 10 (i.e., the amount of ambient light that is striking ambient light sensor 24).

At step 42, device 10 (i.e., control circuitry 30) may gather proximity sensor data indicative of whether or not ambient light sensor 24 is being shadowed by an external object. Proximity sensor data such as data from proximity sensor 26 and/or proximity sensor data from touch electrodes 20 in region 32 of the touch sensor for display 14 may be processed by control circuitry 30 to determine whether or not the accuracy of the ambient light sensor data from ambient light sensor 24 has been compromised by the presence of an external object such as part of a user's hand or other object that is preventing light from reaching ambient light sensor 24. In determining whether ambient light sensor 24 has been blocked, control circuitry 30 may use data from proximity sensor 26 (e.g., by comparing a measured proximity sensor signal to a predetermined threshold), may use data from region 32 of touch screen display 14 (e.g., to determine whether any of the electrode or more than a predetermined number of electrodes is producing a signal that is greater than a predetermined threshold) and/or may use a signals from both sensor 26 and touch screen display (and/or other proximity data) in determining whether or not ambient light sensor 24 has been blocked.

In response to determining that ambient light sensor 24 has been blocked (i.e., in response to concluding that an external object cast a shadow on ambient light sensor 24 when ambient light sensor 24 made the ambient light sensor reading), control circuitry 30 may, at step 44, ignore the data from ambient light sensor 24 (i.e., the ambient light sensor data may be suppressed). Operations may then loop back to step 40 so that more ambient light sensor data may be gathered, as indicated by line 48.

In response to determining that ambient light sensor 24 is not blocked, control circuitry 30 may use the gathered ambient light data in determining how to adjust display brightness (step 46).

Figure 4:
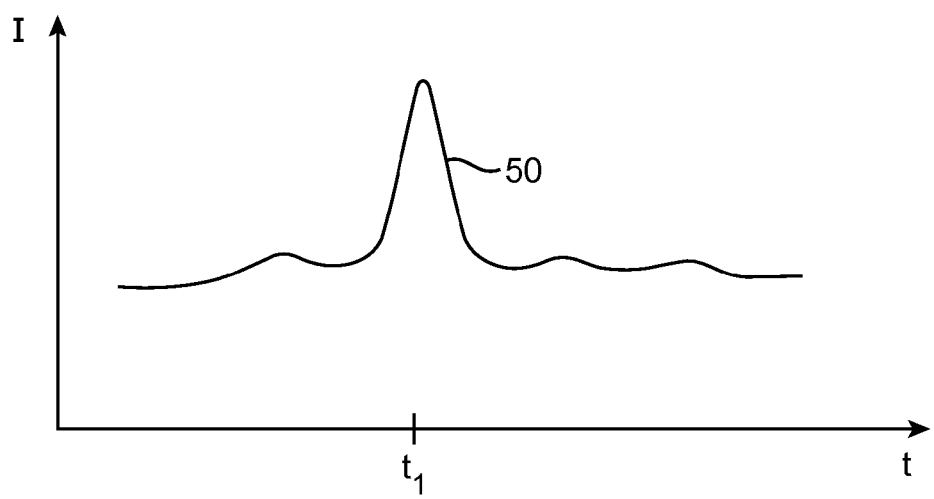
FIG. 4 is a graph showing how an ambient light signal may exhibit a spike due to a brief change in ambient lighting conditions in accordance with an embodiment of the present invention.

FIG. 4 is a graph showing how measured ambient light signals may exhibit intensity transients such as intensity transient 50. Transients may result from abrupt increases or decreases in ambient light intensity at sensor 24. In the example of FIG. 4, transient 50 corresponds to a momentary increase in ambient light intensity at time t1. The momentary increase in light intensity may be characterized by a duration of about one second (as an example).

Figure 5:
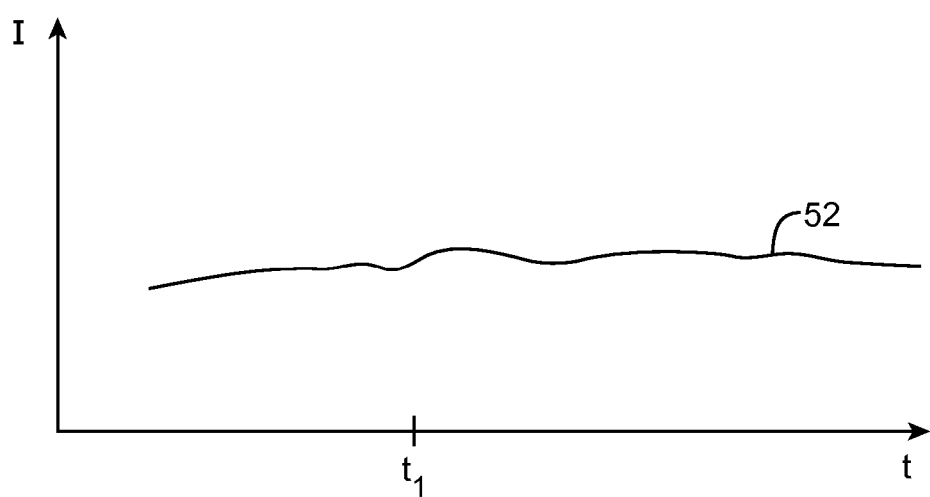
FIG. 5 is a diagram showing how an electronic device with a spike filter may suppress fast ambient light transients such as the ambient light spike of FIG. 4 in accordance with an embodiment of the present invention.

Transient ambient light signals that are measured by ambient light sensor 24 may be suppressed to improve the predictability of device 10 to sudden changes in ambient light levels. With one suitable arrangement, control circuitry 30 may be configured to implement a low pass filter (spike filter) that suppresses transient events in the ambient light signal. The spike filter may, as an example, suppress transients that are characterized by durations of less than five seconds, less than two seconds, or less than one second (as examples). In the example of FIG. 5, the ambient light signal of FIG. 4 has been filtered using a two-second spike filter. As shown by curve 52 in FIG. 5, transient 50 of FIG. 4 at time t1 has been removed and will therefore not be used by circuitry 30 in determining how to respond to changes in ambient light level.

Control circuitry 30 may make display brightness adjustments gradually so as not to create distractingly abrupt display changes for the user of device 10. Different time constants may be used in making display brightness increases and display brightness decreases. Increases in display brightness may be made at a faster speed than decreases in display brightness. The amount of change to be made (i.e., the magnitude of the target display brightness level minus the initial display brightness level) may be taken into account when making adjustments to display brightness. Display brightness changes may be linear as a function of measured ambient light intensity changes or non-linear display brightness adjustment functions may be used.

Figure 6:
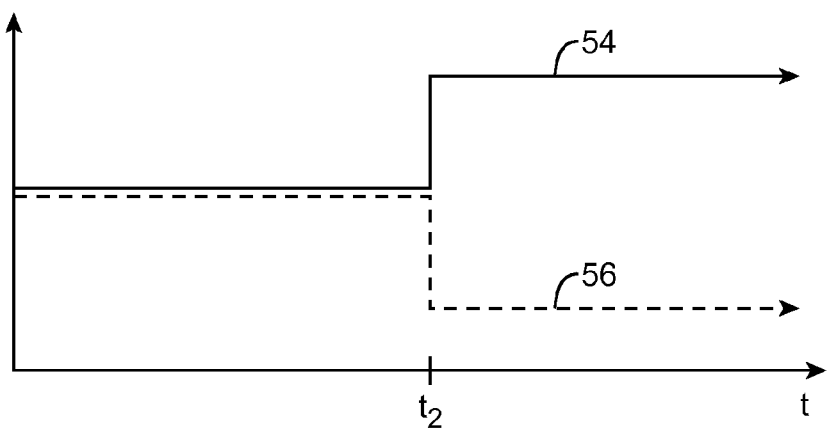
FIG. 6 is a graph showing illustrative changes in ambient light level that may be experienced by an electronic device in accordance with an embodiment of the present invention.

FIG. 6 is a graph showing how the intensity of ambient light that is measured by ambient light sensor 24 may increase (curve 54) or decrease (curve 56). In the example of FIG. 6, measured ambient light intensity changes at time t2.

Figure 7:
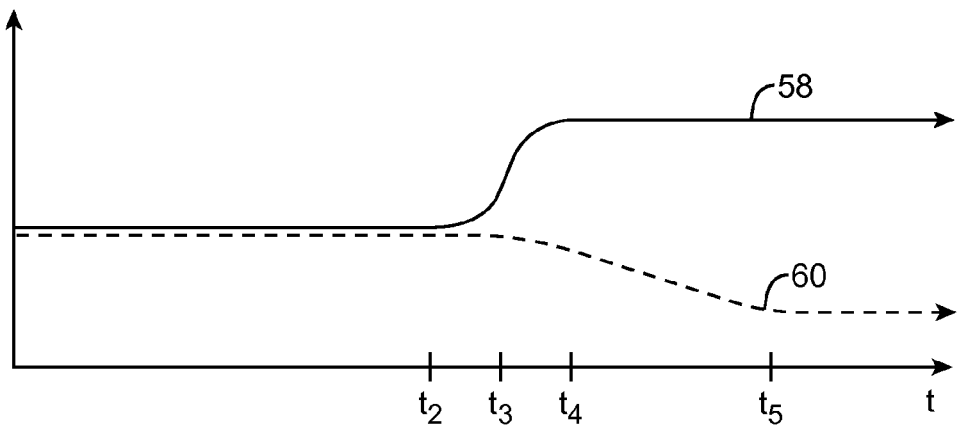
FIG. 7 is a graph showing how an electronic device may adjust display brightness levels in response to measured changes in ambient light level of the type shown in FIG. 6 in accordance with an embodiment of the present invention.

After a delay associated with an optional transient filter (i.e., after a delay of about two seconds when using a two second spike filter), control circuitry 30 may respond to the measured ambient light sensor levels of FIG. 6 by increasing or decreasing display brightness accordingly. Consider, as an example, the display brightness curves of FIG. 7. Curve 58 corresponds to display brightness levels for display 14 when control circuitry 30 measures ambient light data such as the data of curve 54. Curve 60 corresponds to display brightness levels for display 14 when control circuitry 30 measures ambient light data such as the data of curve 56 of FIG. 6.

The delay between time t2 (when the ambient light sensor initially measures the change in ambient light levels of FIG. 6) and time t3 (when display brightness begins to increase) corresponds to the delay time associated with the spike filter (e.g., about two seconds or other suitable duration). In response to detecting the increase in ambient light level of curve 54, control circuitry 30 may raise display brightness in accordance with curve 58 of FIG. 7. In response to detecting the decrease in ambient light level of curve 56, control circuitry 30 may lower display brightness following curve 60 of FIG. 7.

If desired, different time constants (rates of change) may be used when making display brightness increases and decreases. For example, the brightness increase of the example of FIG. 7 may have a duration of t4-t3, whereas the brightness decrease of the example of FIG. 7 may have a duration of t5-t4 that is longer than t4-t3. The human eye tends to be more sensitive to rapid display brightness decreases than increases. Using a longer time constant for display brightness decreases than display brightness increases may therefore allow device 10 to make changes smoothly and quickly without being distracting to the user. Display brightness changes may be made linearly with respect to time or a non-linear brightness change function may be used by control circuitry 30.

Figure 8:
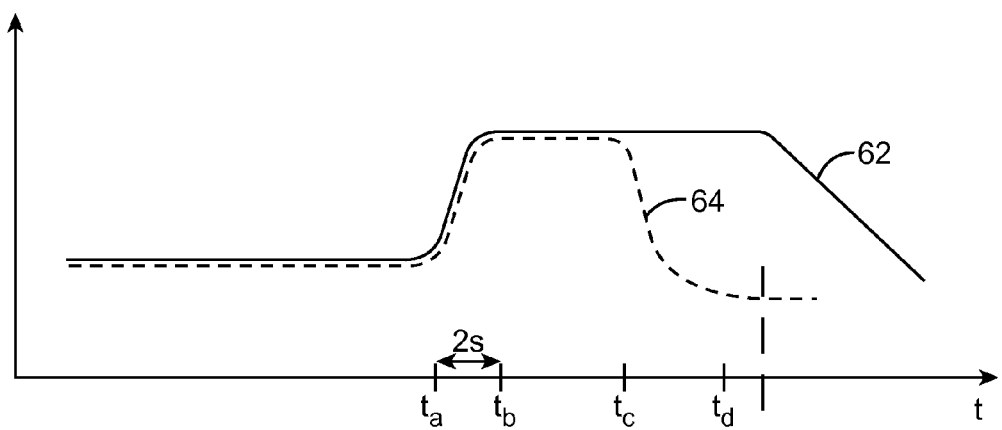
FIG. 8 is a graph of illustrative changes in ambient light level that may be measured by an electronic device in accordance with an embodiment of the present invention.
Figure 9:
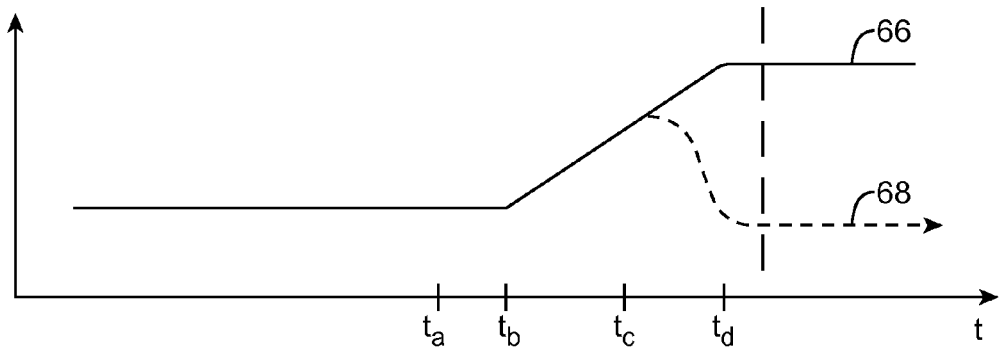
FIG. 9 is a graph showing how an electronic device may adjust display brightness levels in response to measured changes in ambient light level of the type shown in FIG. 8 in accordance with an embodiment of the present invention.

It may be desirable to provide device 10 with an automatically adjusting baseline display brightness level (e.g., in configurations of the type shown in FIG. 1B that include touch-based proximity sensing capabilities, but no light-based proximity sensor such as light-based proximity sensor 24 of FIG. 1A). FIGS. 8 and 9 are graphs illustrating how control circuitry 30 may make automatic display brightness baseline adjustments.

Two different ambient light scenarios are illustrated by curves 62 and 64 of FIG. 8. In both scenarios (curves 62 and 64), ambient light intensity rises significantly at time ta. In the scenario of curve 64, ambient light intensity drops back to its initial level at time tc. In the scenario of curve 62, ambient light intensity is maintained at an elevated level until a later time (time td).

Curves 66 and 68 illustrate how control circuitry 30 may make corresponding adjustments to a baseline display brightness level (i.e., a minimum value for display brightness). Curve 68 of FIG. 9 corresponds to display brightness baseline changes that control circuitry 30 may make in response to measurement of the ambient light changes of curve 64 of FIG. 8. Curve 66 of FIG. 9 corresponds to baseline changes that control circuitry 30 may make in response to the ambient light intensity levels of curve 62 of FIG. 8.

As shown in FIG. 9, control circuitry 30 may initially make no baseline changes (e.g., for a time period tb-ta equal to the duration associated with the spike filter). At time tb, control circuitry 30 can make display brightness baseline increases in response to the measured increases in ambient light levels of FIG. 6. Control circuitry 30 may make persistent changes in the display brightness baseline (i.e., changes that do not drop in value) whenever a persistence threshold (e.g., a threshold of about 7 seconds or other suitable predetermined time period threshold) has been exceeded. Using this type of approach, changes in ambient light level that last less than the threshold amount of time are considered to be temporary and not appropriate for making lasting display brightness baseline changes. Changes in ambient light level that last for more than the threshold amount are considered to be persistent and result in a corresponding persistent change in display brightness baseline.

As shown by curve 68 of FIG. 9, for example, control circuitry 30 may initially increase the display brightness baseline in response to detection of the increase in ambient light level of curve 64 of FIG. 8. But because ambient light level 64 of FIG. 8 drops at time tc (e.g., a time insufficient to exceed the persistence threshold), control circuitry 30 may return the display brightness baseline of curve 68 of FIG. 9 to its initial value when light level 64 of FIG. 8 drops. As shown by curve 66 of FIG. 9, on the other hand, control circuitry 30 may make a persistent change in the display brightness baseline in response to detection of a more lasting ambient light level increase of the type illustrated by curve 62 of FIG. 8 (i.e., an increased ambient light level that is maintained past time tc to time td). Even though ambient light level 62 drops after time td, ambient light level 62 remained elevated for long enough (e.g., more than 7 seconds or other suitable time period) that control circuitry 30 may consider this measured change sufficient to warrant a persistent change in display brightness baseline, as shown by the elevated value of curve 66 at times after time td in FIG. 9.

The display brightness baseline may be used as a minimum allowable display brightness level until the brightness level is reset (e.g., by a power-off event or other suitable criteria).

Figure 10:
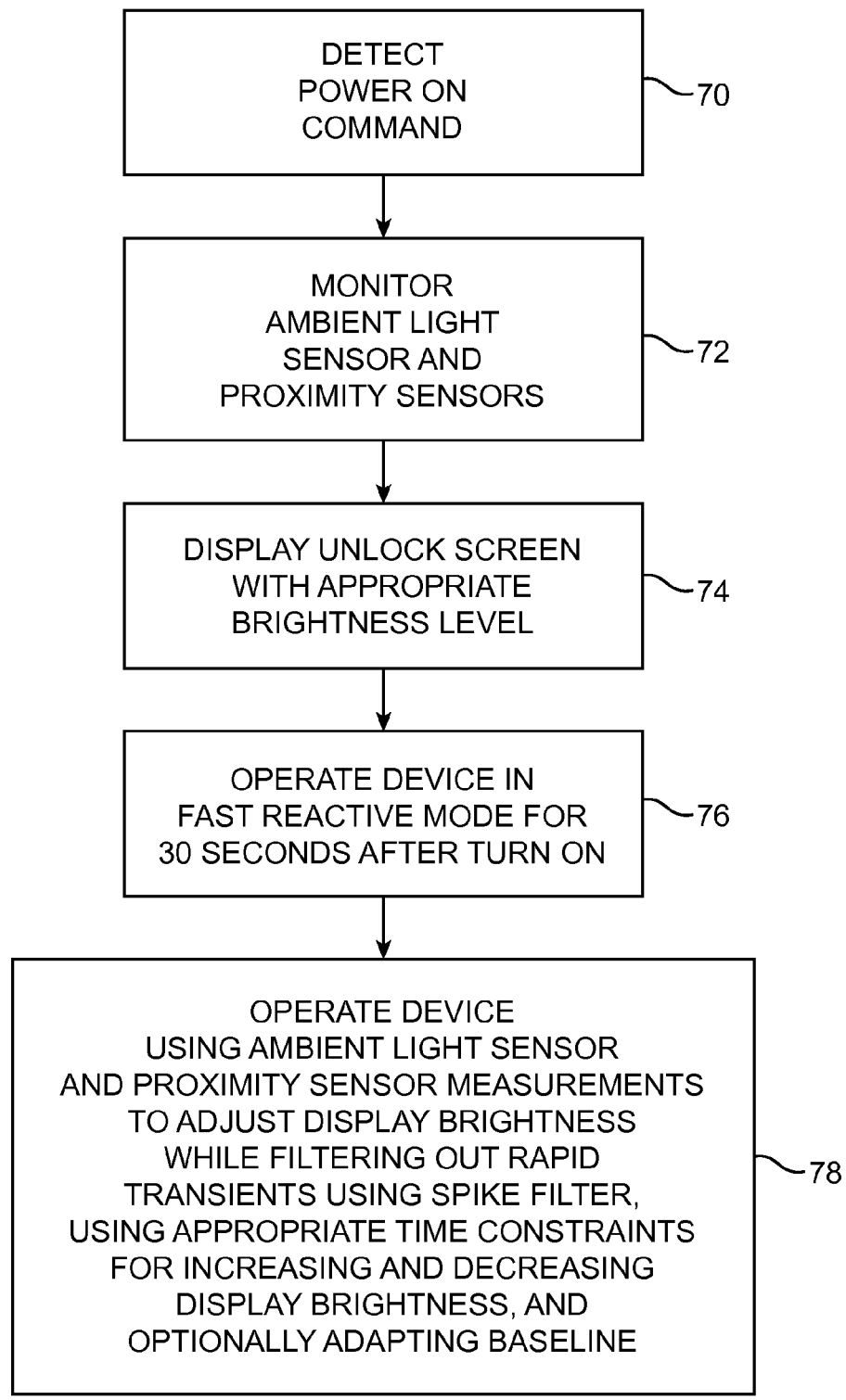
FIG. 10 is a flow chart of illustrative steps involved in adjusting display brightness levels in an electronic device in accordance with an embodiment of the present invention.

FIG. 10 is a flow chart of illustrative steps involved in operating device 10.

At step 70, control circuitry 30 may detect a power on command. Control circuitry 30 may, for example, detect a button press on a power button or may otherwise receive a command from a user to power up device 10 and display 14.

At step 72, immediately after power-up, control circuitry 30 may use ambient light sensor 24 to measure the ambient light level in the vicinity of device 10. Proximity sensor measurements may also be made.

Control circuitry 30 may enter a fast reactive mode following power up. In this mode, control circuitry 30 may make display brightness adjustments quickly (e.g., within 0.2 seconds or other small time). This allows control circuitry 30 to adjust display brightness rapidly enough to accommodate the relatively large and quick ambient light level changes that might be experienced by a user who is powering up a device (e.g., when turning on a device and rapidly removing the device from a coat pocket, etc.). During step 74, control circuitry 30 may, for example, display an unlock screen (or other screen appropriate for presenting to a user immediately after a power-up event) on display 14 using a brightness that is based on the ambient light level measured during step 72. If the proximity sensor data that was gathered during step 72 indicates that the ambient light sensor is blocked, the ambient light sensor data can be suppressed until valid data is gathered. A default brightness may be used in the absence of valid ambient light sensor data.

Control circuitry 30 may make display brightness adjustments in the fast reactive mode for a predetermined period of time (e.g., 30 seconds), as illustrated by step 76.

Following completion of the fast reactive mode period, control circuitry 30 can operate display 14 normally (step 78). During the operations of step 78, ambient light sensor 24 may gather ambient light sensor measurements that control circuitry 30 can use in adjusting display brightness. A transient filter (spike filter) may be used in filtering out transient ambient light measurements. Proximity data may be used in suppressing ambient light sensor data when control circuitry 30 can conclude that a user's hand or other external object is in the vicinity of ambient light sensor 24 and is therefore blocking ambient light sensor 24. Adaptive display brightness baseline operations may be performed, if desired. For example, persistent display brightness baseline adjustments may be made when elevated ambient light levels are detected for more than a predetermined threshold.

Electronic devices such as electronic device 10 may be used in displaying content such as electronic book content and other media. Control circuitry 30 may use a transfer function that determines an appropriate display brightness level to use for various measured ambient light levels. The transfer function may help ensure that electronic book content and other content is satisfactorily displayed for a user over a wide range of ambient light levels. A user of an electronic device may, if desired, make adjustments to the transfer function to customize the display brightness performance of the electronic device. The transfer function may have different types of behavior at low, medium, and high ambient light intensities. The way in which user adjustments to the transfer function are made may also change as a function of ambient light level, if desired.

Figure 11:
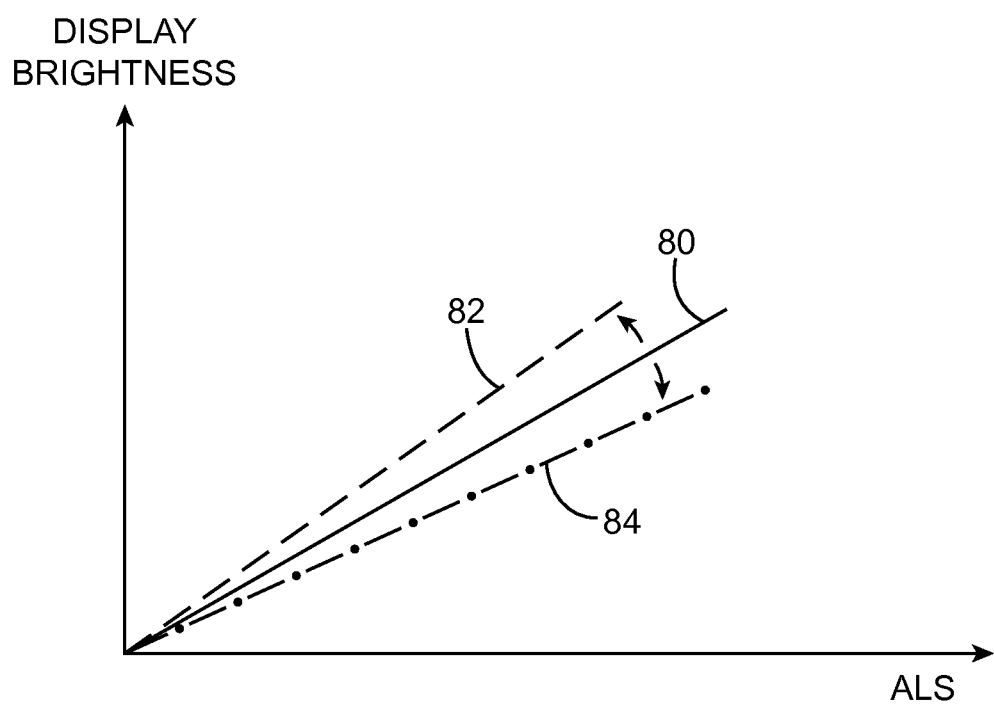
FIG. 11 is a graph showing an illustrative transfer function that may be used by an electronic device in determining how to adjust display brightness as a function of measured ambient light level when operating at relatively high ambient light levels in accordance with an embodiment of the present invention.

FIG. 11 is a graph of an illustrative transfer function that maps measured ambient light sensor levels (ALS) to corresponding levels of display brightness for display 14. As shown in the FIG. 11 example, transfer function 80 may, as an example, have a linear behavior so that increases in measured ambient light sensor result in corresponding increases in display brightness. This type of behavior is characteristic of what would be expected when illuminating a page of paper content with ambient light. When the ambient light level increases (e.g., when a user walks outside with a book on a sunny day), the brightness of the paper pages of the book will increase in direct proportion to the increase in the intensity of the light striking the paper.

The amount of linear increase in paper brightness in this type of environment that is produced for a given increase in ambient light intensity is influenced by the reflectivity of the paper. Highly reflective papers will exhibit greater increases in paper brightness for a given increase in ambient light intensity than papers with low reflectivity.

Transfer function 80 of FIG. 11 replicates (in an electronic device) the type of brightness changes with ambient light level that a reader of a paper book would expect. If desired, the slope of transfer function 80 may be adjusted to model different types of paper. For example, a transfer function with a steeper slope such as transfer function 82 may be used in device 10 when it is desired to replicate the behavior of an illuminated paper document that is more reflective than the paper modeled by transfer function 80. A transfer function with a shallower slope such as transfer function 84 may be used when it is desired to replicate the behavior of an illuminated paper document that is less reflective than the paper modeled by transfer function 80. A slope of a transfer function may also be known as a rate of change of brightness with respect to changes in ambient light level.

Because linear transfer functions of the type shown in FIG. 11 can be used to model the behavior of materials such as paper that are characterized by a given reflectivity, a linear transfer function behavior such as the behavior of functions 80, 82, and 84 may sometimes be referred to as a reflective behavior. An ambient-light-sensor-to-display-brightness transfer function that models a reflective behavior may sometimes be said to exhibit a reflective transfer function characteristic.

Another type of behavior that may be modeled by an ambient-light-sensor-to-display-brightness transfer function relates to the use of a user-controlled lamp to illuminate the paper in a book. In an environment where a lamp is used to produce illumination in addition to existing ambient light, the brightness of the paper (or other content illuminated by the lamp) will be affected by the brightness setting for the lamp in addition to the ambient light level. In dark environments, the setting of the lamp will dominate.

Figure 12:
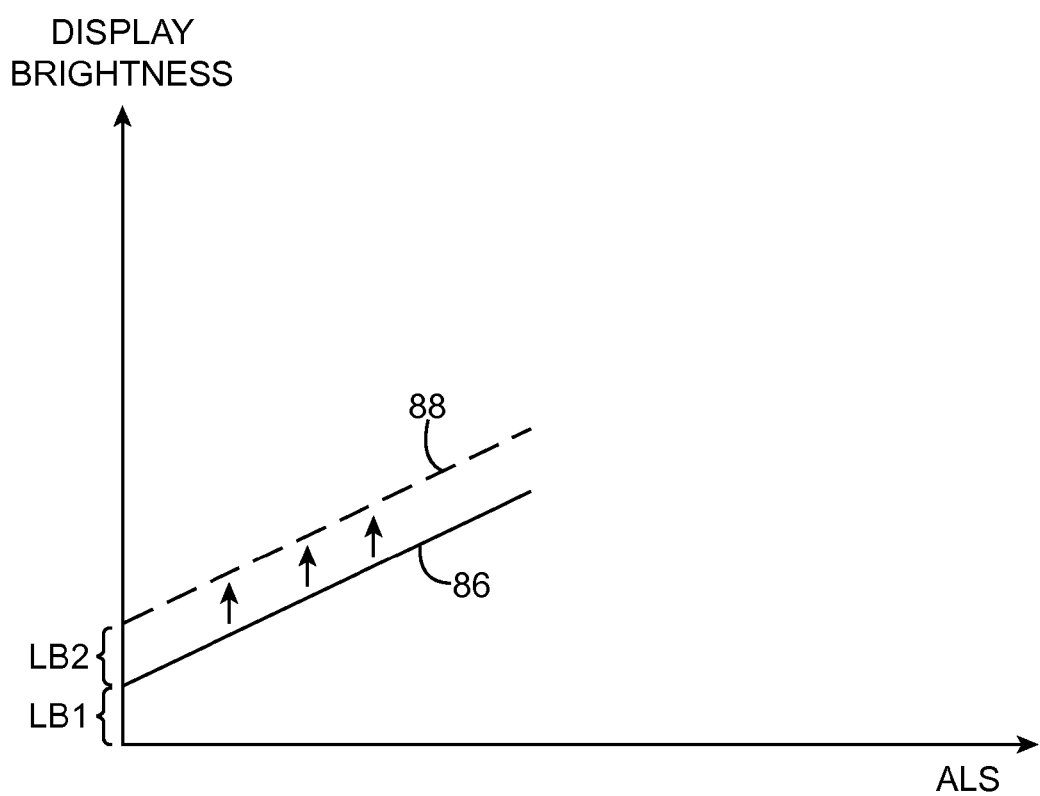
FIG. 12 is a graph showing an illustrative transfer function that may be used by an electronic device in determining how to adjust display brightness as a function of measured ambient light level when operating at moderate ambient light levels in accordance with an embodiment of the present invention.

Transfer function 86 of FIG. 12 replicates, in an electronic device, the use of a lamp to illuminate a book or other content in addition to ambient lighting. As shown in FIG. 12, due to the presence of the lamp, there is some residual (lamp-based) illumination as ambient light levels drop towards zero (i.e., there is a non-zero display brightness level LB1 as ambient light signal ALS approaches zero). If the user were to adjust the "lamp" to produce more illumination, transfer function 86 would be changed from curve 86 to curve 88 of FIG. 12. An ambient-light-sensor-to-display-brightness transfer function that involves a lamp-type operation of the type illustrated in FIG. 12 may sometimes be said to exhibit a lamp transfer function characteristic.

Figure 13:
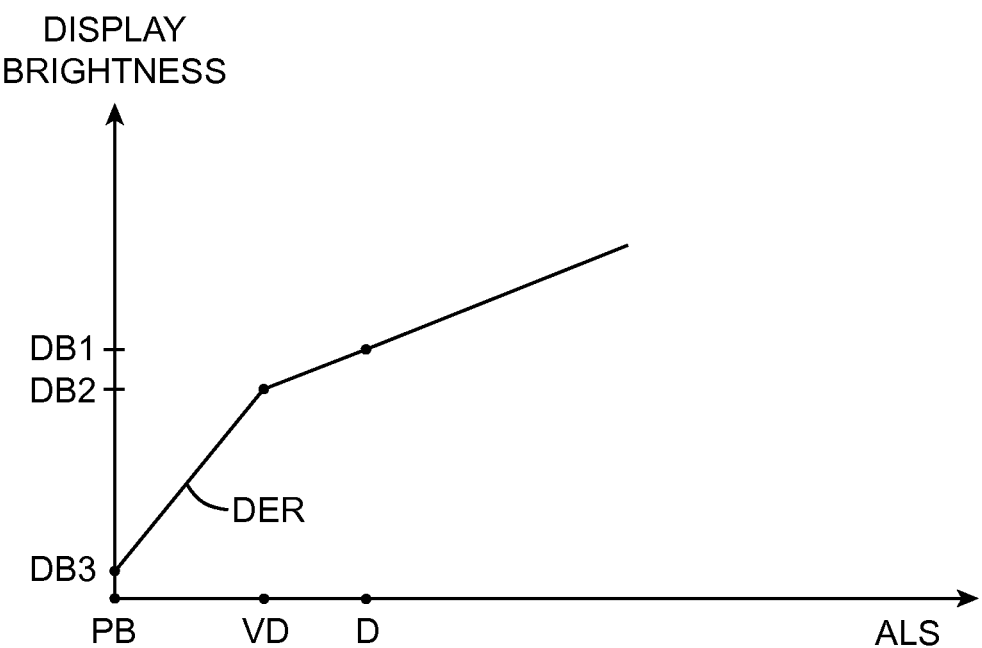
FIG. 13 is a graph showing an illustrative transfer function that may be used by an electronic device in determining how to adjust display brightness as a function of measured ambient light level when operating at low ambient light levels in accordance with an embodiment of the present invention.

At very low light levels, a user may expect the change in brightness of a book to change more when moving from a very dark environment to a pitch black environment than when moving from a dark environment to the very dark environment. This type of human "dark eye response" can be modeled using a transfer function such as transfer function 90 of FIG. 13. In the example of FIG. 13, ambient light level D corresponds to a dark environment, ambient light level VD corresponds to a very dark environment, and ambient light level PB corresponds to a pitch black environment. As shown in FIG. 13, human dark eye response behavior may be modeled by adjusting display brightness so that there is a larger drop in display brightness when moving from ambient light level VD to ambient light level PB (display brightness change DB2-DB3) than when moving from ambient light level D to ambient light level VD (display brightness change DB1-DB2). An ambient-light-sensor-to-display-brightness transfer function characteristic that has an accelerated decrease in display brightness with falling ambient light sensor readings of the type exhibited by segment DER of FIG. 13 may sometimes be referred to as a dark eye response transfer function characteristic.

Control circuitry 30 of device 10 may be used to implement an ambient-light-sensor-to-display-brightness transfer function with one or more distinct regions. For example, at low ambient light levels, the transfer function may exhibit a dark eye response characteristic. At moderate ambient light levels, the transfer function may exhibit lamp transfer function characteristics. At elevated ambient light levels, the transfer function may exhibit reflective transfer function characteristics. Above a threshold ambient light level, the display brightness display may be maximized. In general, the ambient-light-sensor-to-display-brightness transfer function may exhibit one or more transfer function characteristics such as these, two or more transfer function characteristics such as these, three or more transfer function characteristics such as these, or four or more transfer function characteristics such as these (as examples).

Figure 14:
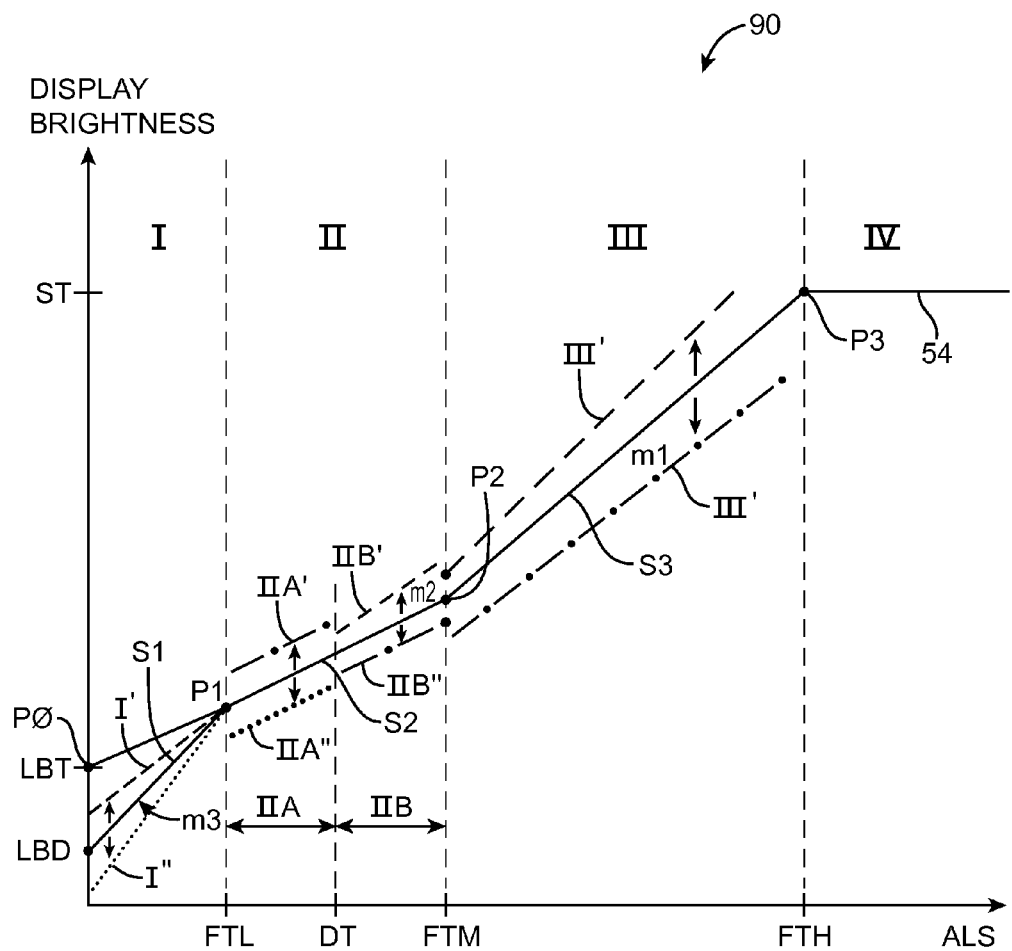
FIG. 14 is a graph showing an illustrative transfer function that may be used by an electronic device in determining how to adjust display brightness as a function of measured ambient light level over a range of ambient light levels from low ambient light levels to high ambient light levels in accordance with an embodiment of the present invention.

FIG. 14 is a graph of an illustrative ambient-light-sensor-to-display-brightness transfer function that has different types of behaviors at different ambient light sensor levels. The ambient light sensor levels associated with transfer function 90 of FIG. 14 can be divided into four ranges (I, II, III, and IV). Range II may be subdivided into two sub-ranges IIA and IIB by dynamic threshold DT. Fixed ambient light sensor thresholds FTL, FTM, and FTH may be used to respectively divide ranges I and II, II and III, and III and IV.

In range IV, at ambient light levels above threshold FTH (i.e., at very high ambient light levels), display brightness may have reached its maximum achievable value ST. Accordingly, segment S4 of transfer function 90 beyond point P3 may be characterized by a fixed (flat) value of ST.

In range III, at ambient light levels between thresholds FTM and FTH (i.e., at high ambient light levels), segment S3 of transfer function 90 extending between points P3 and P2 may exhibit a reflective transfer function characteristic.

In range II, at ambient light levels between thresholds FTL and FTM (i.e., at moderate ambient light levels), segment S2 of transfer function 90 extending between points P2 and P1 may exhibit a lamp transfer function characteristic.

In range I, at ambient light levels below threshold FTL (i.e., at low ambient light levels), segment S1 of transfer function 90 between points P1 and P0 may exhibit a dark eye response transfer function characteristic.

The value of display brightness at the minimum (zero or near zero) value of ambient light sensor level ALS is LBD. Display brightness level LBD represents the lamp brightness level in the darkest environment experienced by a user. In the absence of the dark eye response behavior of region I, transfer function 90 would extend from point P1 to point P0 (display brightness level LBT). The value of LBT may be considered to form the "lamp" portion of the display brightness transfer function (i.e., an offset in the transfer function due to non-zero lamp brightness). Due to the dark eye response associated with region I, segment S1 has a steeper slope than the dashed line connecting points P1 and P0 (i.e., the lamp brightness is being phased out as a function of decreasing ALS values in region I so that the transfer function is characterized by a reduced value of LBD rather than value LBT when operated in a completely dark (or nearly completely dark) room. At values above P1 in region II, the lamp contribution (i.e., the fixed brightness contribution that is independent of ALS value) may be progressively phased out. By point P2 on transfer function 90, the lamp contribution has been completely phased out and the value of transfer function 90 is dominated exclusively by the reflective transfer function behavior associated with region III.

The value of dynamic threshold DT may be determined by control circuitry 30 in real time. Dynamic threshold DT may be the ambient light sensor value at which the ambient light reflective component in transfer function 90 and the lamp reflection offset (LBT) component in transfer function 90 are equal. At ambient light levels above DT, the behavior of the transfer function is dominated by reflected ambient light, not lamp brightness. At ambient light levels below DT, lamp brightness dominates.

Control circuitry 30 may provide a user of device 10 with an opportunity to adjust one or more settings associated with transfer function 90. For example, a user may be provided with an opportunity to adjust the values of points P0, P1, P2, and P3. A user may be allowed to adjust the ALS component (x coordinate) of these points, the display brightness component (y coordinate of these points), or both the ALS and display brightness values for each of these points (as examples). One or more slider buttons or other user interface controls (knobs, drop-down menus, sliders, text entry boxes, drop-and-drag features, or other user interface elements) may be used in gathering user input.

With one suitable arrangement, which is sometimes described herein as an example, a user may manipulate a single slider (or other suitable control that allows selection from a range of settings from a low setting to a high setting) to adjust transfer function 90. The type of adjustment that is made by control circuitry 30 in response to the user input from the slider (or other control) may vary as a function of current ambient light level.

If, as an example, device 10 is currently operating in region III, the adjustment of the slider may change slope m1 of segment S3 (e.g., to produce higher-sloped line III' or lower-sloped line III"). (The y-axis intercept—i.e., the display brightness intercept for a line containing segment S3—is zero.)

If device 10 is currently operating in region IIB (i.e., a paper-like operating point that is influenced by a small lamp-type contribution), adjustment of the slider may result in adjustment of slope m2 of segment S2 (e.g., to change segment S2 to a line such as line IIB' with a greater slope or line IIB" with a smaller slope). Adjustment of the slope of segment S2 when the ambient light level is in paper-like region IIB is appropriate, because operation in region IIB is similar to operation in paper-like region III. Upon adjustment of segment S2 in region IIB, point P2 may be vertically adjusted (to a higher or lower display brightness value at the same ambient light sensor value), may be horizontally adjusted (to a higher or lower ambient light sensor value at the same display brightness value), or both the vertical and horizontal components of point P2 may be adjusted to accommodate the new position of segment S2. The adjusted version of segment S2 may extend between adjusted point P2 and point P1.

If device 10 is currently operating in region IIA (i.e., the lamp-like portion of region II), adjustment of the slider by the user may result in a lamp intensity adjustment. For example, an upward adjustment of the slider may move segment S2 from the position shown in FIG. 14 to the position represented by line IIA', whereas a downward adjustment of the slider may move segment S2 from the position shown in FIG. 14 to the position represented by line IIA" (i.e., the slider may be used to adjust the value of LBT). If desired, both LBT and the slope m2 of segment S2 may be adjusted when operating in region IIA. As when adjusting segment S2 during operation in region IIB, adjustments to the slider when operating in region IIA may result in horizontal and/or vertical adjustment to the position of point P2. The location of point P1 may also be adjusted (e.g., horizontally and/or vertically) to accommodate the change in segment S2.

If device 10 is currently operating in region I, adjustment of the slider may produce changes in the value of LBD resulting in new versions of segment S1 such as segment I' (when increasing the slider) and segment I" (when decreasing the slider).

In the example of FIG. 14, transfer function 90 has been formed by joining multiple linear line segments. In regions II and III, transfer function 90 is concave upwards, due to the phase out of the lamp contribution in region II. If desired, other concave functions can be used for transfer function 90 (e.g., functions that do not contain linear line segments but rather have smoothly curved features, functions with different numbers of line segments, etc.).

Figure 15:
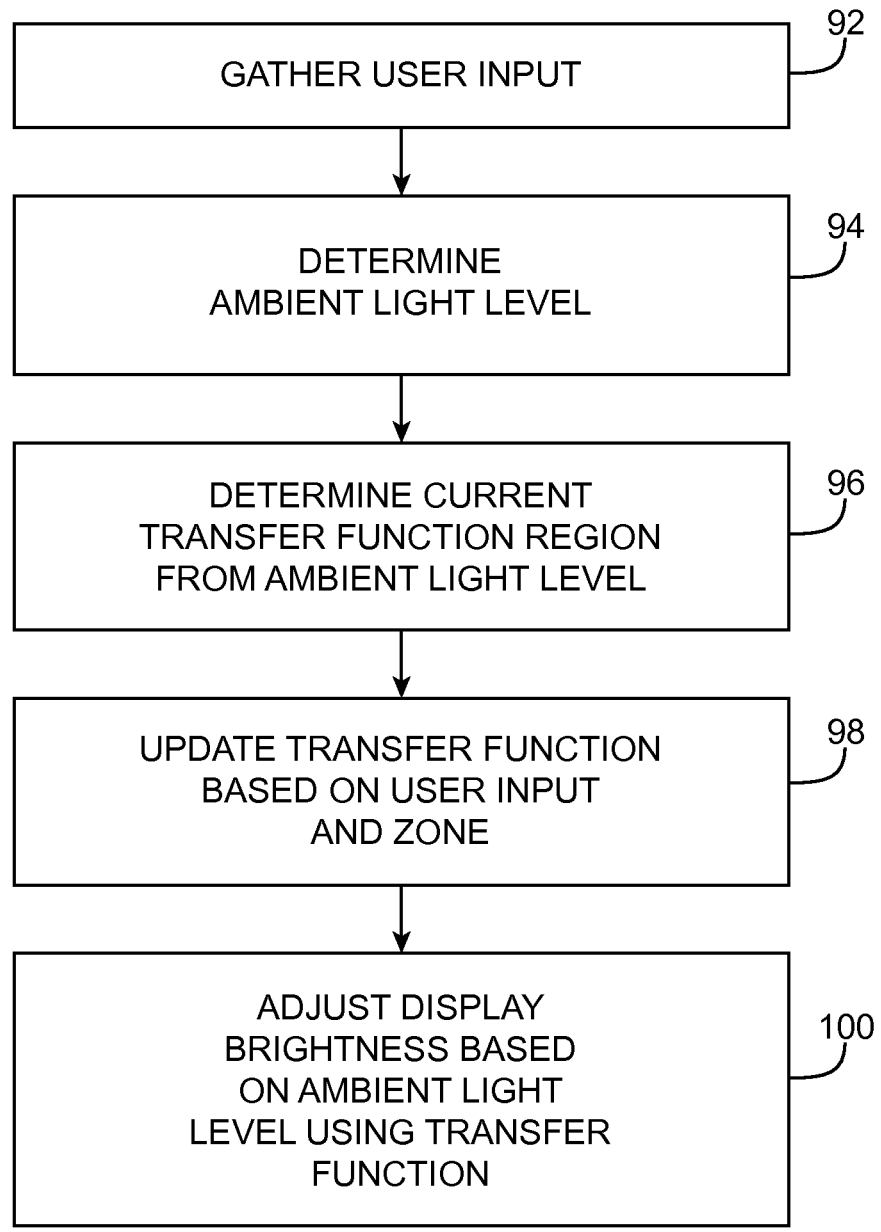
FIG. 15 is a flow chart of illustrative steps involved in allowing a user to make changes to a transfer function that maps ambient light levels to display brightness settings and in using the transfer function to make display brightness adjustments based on ambient light level readings in accordance with an embodiment of the present invention.

FIG. 15 is a flow chart of illustrative steps involved in controlling display brightness using a transfer function such as transfer function 90 of FIG. 14.

At step 92, control circuitry 30 may use input-output circuitry 32 to gather input from a user that directs device 10 to make modifications to transfer function 90. Control circuitry 30 may, for example, use buttons, a touch screen, and other input-output circuitry to gather user input. With one suitable arrangement, control circuitry 30 may display an interactive slider or other user input control element on a touch screen and may gather user input associated with movement of the slider using a touch sensor array in the touch screen. Use of a control element that allows scalar control of a single parameter between a minimum value and a maximum value may help minimize complexity for the user when adjusting transfer function 90.

At step 94, control circuitry 30 may use ambient light sensor 24 to gather information on the current ambient light level surrounding device 10.

At step 96, control circuitry 30 may determine the transfer function region (ambient light sensor range) in which device 10 is currently operating based on the ambient light sensor reading gathered at step 94.

At step 98, control circuitry 30 may update the transfer function based on the slider input or other user input from step 92 and based on information identifying the current transfer function region, as described in connection with FIG. 14.

At step 100, during normal operation of device 10, control circuitry 30 may continually update the display brightness for display 14 based on ambient light sensor readings gathered by control circuitry 30 using ambient light sensor 24. As described in connection with step 78 of FIG. 10, proximity sensor data may be used to suppress the use of ambient light sensor data changes when the proximity sensor data indicates that the ambient light sensor has been shadowed, rapid transients may be filtered out using a spike filter, appropriate time constants may be used when increasing and decreasing display brightness, and control circuitry 30 may maintain an adaptive baseline.

The foregoing is merely illustrative of the principles of this invention and various modifications can be made by those skilled in the art without departing from the scope and spirit of the invention. The foregoing embodiments may be implemented individually or in any combination.

What is claimed is:

1. A method, comprising:
  with an ambient light sensor in an electronic device, collecting ambient light data;

with a proximity sensor in the electronic device, gathering proximity data indicative of whether an external object is shadowing the ambient light sensor;

with control circuitry in the electronic device, determining whether the ambient light data is affected by the external object; and with the control circuitry, adjusting a brightness level for a display in the electronic device based on the ambient light data and the proximity data.

2. The method defined in claim 1 wherein gathering the proximity data comprises gathering data from a light-based proximity sensor.

3. The method defined in claim 2, wherein gathering the proximity data further comprises gathering data from a portion of a capacitive touch sensor array.

4. The method defined in claim 1, wherein adjusting the brightness level of the display in the electronic device comprises:

in response to determining that the ambient light sensor is being shadowed by the external object, adjusting the brightness level while ignoring the ambient light data; and in response to determining that the ambient light sensor is not being shadowed by the external object, adjusting the brightness level according to the ambient light data.

5. The method defined in claim 1, wherein adjusting the brightness level for the display in the electronic device based on the ambient light data and the proximity data comprises filtering out transient events in the ambient light data that have a duration of less than a predetermined cutoff time.

6. The method defined in claim 1, further comprising:

immediately after the electronic device is powered on, adjusting the brightness level for the display in the electronic device in a fast reactive mode in which brightness adjustments are made quickly.

7. The method defined in claim 1, wherein adjusting the brightness level for a display in the electronic device based on the ambient light data and the proximity data comprises:

selecting a transfer function from a plurality of transfer functions, wherein each transfer function is associated with a range of ambient light levels; and adjusting the brightness level for the display in the electronic device based on the transfer function, the ambient light data, and the proximity data.

8. A method of adjusting a brightness of a display in an electronic device, comprising:

determining an ambient light level with an ambient light sensor in the electronic device;

with control circuitry in the electronic device, based on the ambient light level, selecting a transfer function from a plurality of transfer functions, wherein each transfer function is associated with a range of ambient light levels, and wherein selecting the transfer function comprises:

in response to a first ambient light level, selecting a first transfer function; and in response to a second ambient light level that is different than the first ambient light level, transitioning from the first transfer function to a second transfer function; and with the control circuitry in the electronic device, adjusting the brightness of the display in the electronic device according to the selected transfer function.

9. The method defined in claim 8, further comprising:
with the electronic device, gathering user input; and
with the control circuitry in the electronic device, adjusting the selected transfer function according to the user input.

10. The method defined in claim 8, wherein the selected transfer function has an offset component that is independent of ambient light levels.

11. The method defined in claim 10, further comprising:
with the electronic device, gathering user input; and
with the control circuitry in the electronic device, adjusting the selected transfer function according to the user input by adjusting the offset component of the selected transfer function.

12. The method defined in claim 8, wherein the selected transfer function is proportional to ambient light levels.

13. The method defined in claim 12, further comprising:
with the electronic device, gathering user input; and
with the control circuitry in the electronic device, adjusting the selected transfer function according to the user input by adjusting a slope of the selected transfer function.

14. The method defined in claim 8, wherein based on the ambient light level, selecting the transfer function from the plurality of transfer functions comprises:

when the ambient light level is in a first range of ambient light, selecting a transfer function that has an offset component that is independent of the ambient light level; and when the ambient light level is in a second range of ambient light higher than the first range, selecting a transfer function that is proportional to the ambient light level.

15. The method defined in claim 14, wherein based on the ambient light level, selecting the transfer function from the plurality of transfer functions further comprises:

when the ambient light level is in a low range of ambient light lower than the first range, selecting a transfer function that exhibits a greater decrease in display brightness with falling ambient light level as compared to the transfer function in the first range.

16. The method defined in claim 8, comprising:
determining a subsequent ambient light level with the ambient light sensor in the electronic device;
if the subsequent ambient light level is greater than the ambient light level, increasing the brightness of the display according to a first time constant; and
if the subsequent ambient light level is less than the ambient light level, decreasing the brightness of the display according to a second time constant, wherein the second time constant is greater than the first time constant.

17. An electronic device, comprising:
a display;
an ambient light sensor that senses ambient light and generates ambient light data;
a proximity sensor that senses whether an external object is present and generates proximity data; and
control circuitry for determining whether the presence of the external object affects the ambient light data and for adjusting a brightness level of the display based on the ambient light data and the proximity data.

18. The electronic device defined in claim 17 wherein the control circuitry is configured to ignore a decrease in ambient light as sensed by the ambient light sensor when a nearby external object is sensed by the proximity sensor.

19. The electronic device defined in claim 17, wherein the control circuitry is configured to increase the brightness level of the display for increases in the sensed ambient light, wherein a rate of the increase in the brightness level is dependent on which range of a plurality of ranges of ambient light levels corresponds to the sensed ambient light.

20. The electronic device defined in claim 17, wherein the proximity sensor comprises an infrared proximity sensor.

21. The electronic device defined in claim 17, wherein the proximity sensor comprises a portion of a capacitive touch sensor array.

22. The electronic device defined in claim 17, wherein the control circuitry is configured to operate in a fast reactive mode immediately after the electronic device is powered on, wherein in the fast reactive mode the control circuitry quickly adjusts the brightness of the display based on the ambient light data and proximity data, wherein following the fast reactive mode, the control circuitry is configured to ignore transient events in the ambient light data that have a duration of less than a predetermined cutoff time.

* * * * *